(12) United States Patent
Bennet et al.

(10) Patent No.: US 7,913,970 B2
(45) Date of Patent: Mar. 29, 2011

(54) FOOD PREPARATION MOULD

(75) Inventors: Barry K. Bennet, Spit Junction (AU);
Barry Ashley Bennett, legal representative, Spit Junction (AU);
Geoffrey R. Hamblin, Willoughby (AU); Robert Moran, Mona Vale (AU)

(73) Assignee: Kent Paper Co. Pty. Ltd., Balgowlah (AU)

( * ) Notice: Subject to any disclaimer, the term of this patent is extended or adjusted under 35 U.S.C. 154(b) by 715 days.

(21) Appl. No.: 11/794,023

(22) PCT Filed: Dec. 23, 2005

(86) PCT No.: PCT/AU2005/001958
§ 371 (c)(1),
(2), (4) Date: Aug. 27, 2007

(87) PCT Pub. No.: WO2006/066349
PCT Pub. Date: Jun. 29, 2006

(65) Prior Publication Data
US 2008/0111050 A1    May 15, 2008

(30) Foreign Application Priority Data

Dec. 24, 2004 (AU) ............................... 2004907386
Aug. 3, 2005 (AU) ............................... 2005904164

(51) Int. Cl.
*B29C 33/12* (2006.01)
*A21B 3/13* (2006.01)
*A47J 43/00* (2006.01)
(52) U.S. Cl. ........ 249/127; 249/134; 249/139; 249/155; 249/DIG. 1; 249/DIG. 2; 99/427; 229/123.2
(58) Field of Classification Search ............ 99/427–428, 99/432; 426/512; 220/495.02, 4.32, 23.4, 220/481, 638; 229/117.08, 123.2, 163, 184, 185; 249/61, 117, 120, 122, 127, 134, 136, 139, 142, 155, 156, 159, 162, 164, 173, 183, DIG. 1, DIG. 2
See application file for complete search history.

(56) References Cited

U.S. PATENT DOCUMENTS
899,292 A    9/1908    Carter
(Continued)

FOREIGN PATENT DOCUMENTS
CA    1246884    12/1988
(Continued)

OTHER PUBLICATIONS

Page 1 of Translation of FR 2574627.*

*Primary Examiner* — Joseph S Del Sole
*Assistant Examiner* — Dimple Bodawala
(74) *Attorney, Agent, or Firm* — David B. Tingey; Kirton & McConkie

(57) ABSTRACT

A mold 10, 30, 40 particularly for use in food preparation comprising a base 11, and a collar 12 having a continuous wall 14 that upstands from the base with a lower edge 16 of the collar abutting the base 11. The mold may be for single use with the base and the collar being formed from fiberboard and in a particular form the collar wall incorporates a releasable connection to enable opening of the collar. In one form, the collar includes tabs 25 that extend from the lower edge 16 and retaining means (18, 19, 31) which are operative to retain the tabs in relation to the base so as to retain the lower edge 16 of the collar in proximity with the base. The mold further includes in one form an insert 19 which is locatable within the mold cavity 17 and in another form a support arrangement (29, 42, 43) is provided to support the collar wall.

28 Claims, 4 Drawing Sheets

U.S. PATENT DOCUMENTS

| | | | |
|---|---|---|---|
| 2,411,857 A * | 12/1946 | Harriss | 426/302 |
| 2,827,849 A * | 3/1958 | Paris | 249/159 |
| 2,960,218 A * | 11/1960 | Cheeley | 206/223 |
| 3,107,587 A | 10/1963 | Tipton | |
| 3,128,725 A | 4/1964 | Becker et al. | |
| 3,148,444 A * | 9/1964 | Stark | 29/455.1 |
| 3,537,866 A * | 11/1970 | Weller et al. | 426/275 |
| 3,848,795 A * | 11/1974 | Bird et al. | 220/617 |
| 4,105,153 A * | 8/1978 | Locke | 229/109 |
| 4,156,516 A | 5/1979 | Oliver | |
| 4,676,475 A | 6/1987 | Grandin et al. | |
| 4,965,424 A | 10/1990 | Bagley | |
| 5,056,679 A * | 10/1991 | Lonczak | 141/390 |
| 5,582,389 A * | 12/1996 | Greene | 249/61 |
| 5,676,050 A * | 10/1997 | Beck | 99/428 |
| 6,753,030 B2 | 6/2004 | Reed | |
| 2006/0278559 A1* | 12/2006 | Hamblin et al. | 206/562 |
| 2007/0029703 A1* | 2/2007 | Perez, Jr. | 264/299 |

FOREIGN PATENT DOCUMENTS

| | | |
|---|---|---|
| DE | 8318674 U1 | 3/1984 |
| FR | 2574627 | 6/1986 |
| GB | 539942 | 9/1941 |
| GB | 1077071 | 7/1967 |
| GB | 2067886 A | 8/1981 |
| WO | WO 96/09767 | 4/1996 |
| WO | WO 98/02045 | 1/1998 |
| WO | WO 2004/066735 A1 | 8/2004 |

* cited by examiner

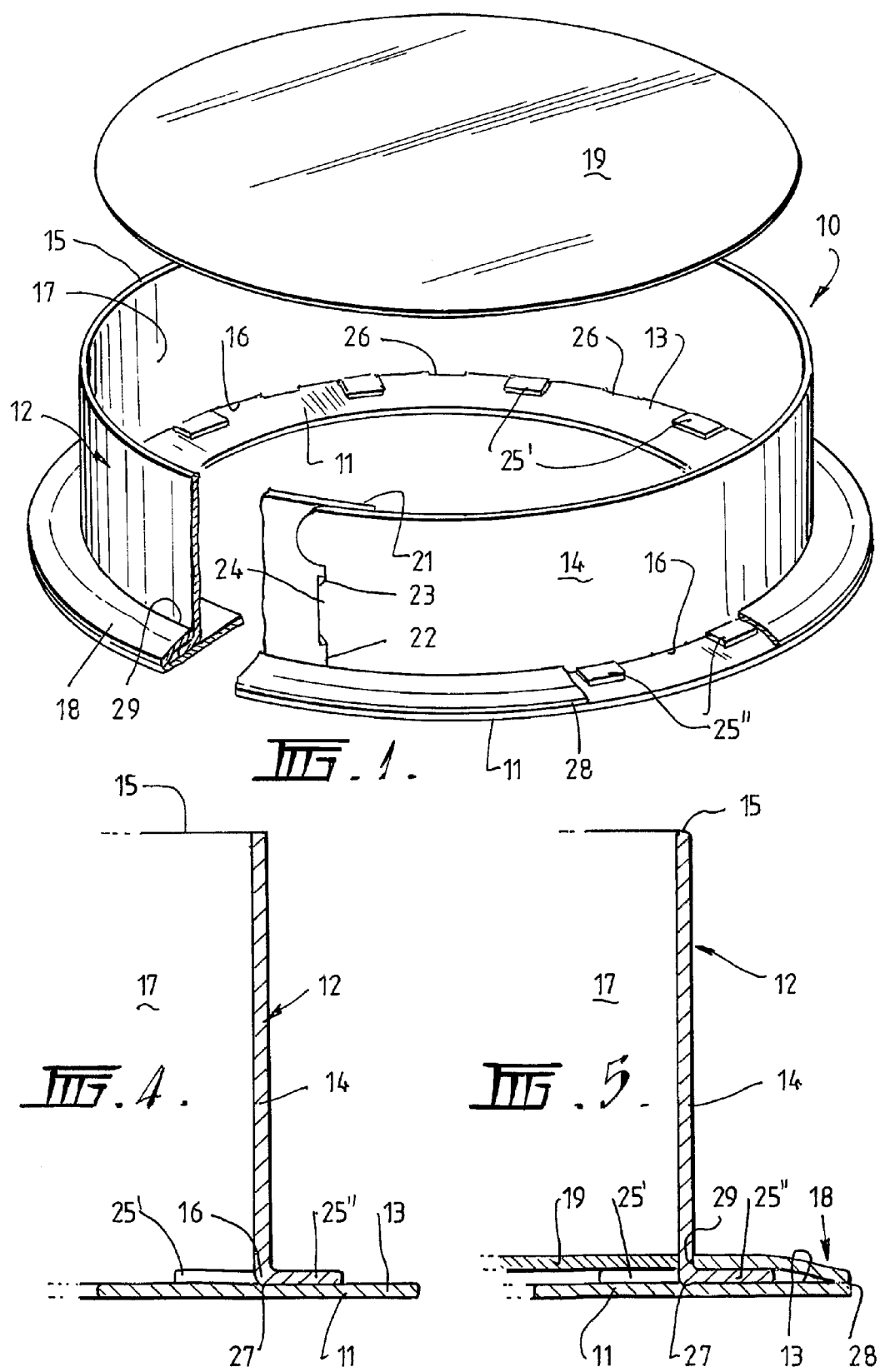

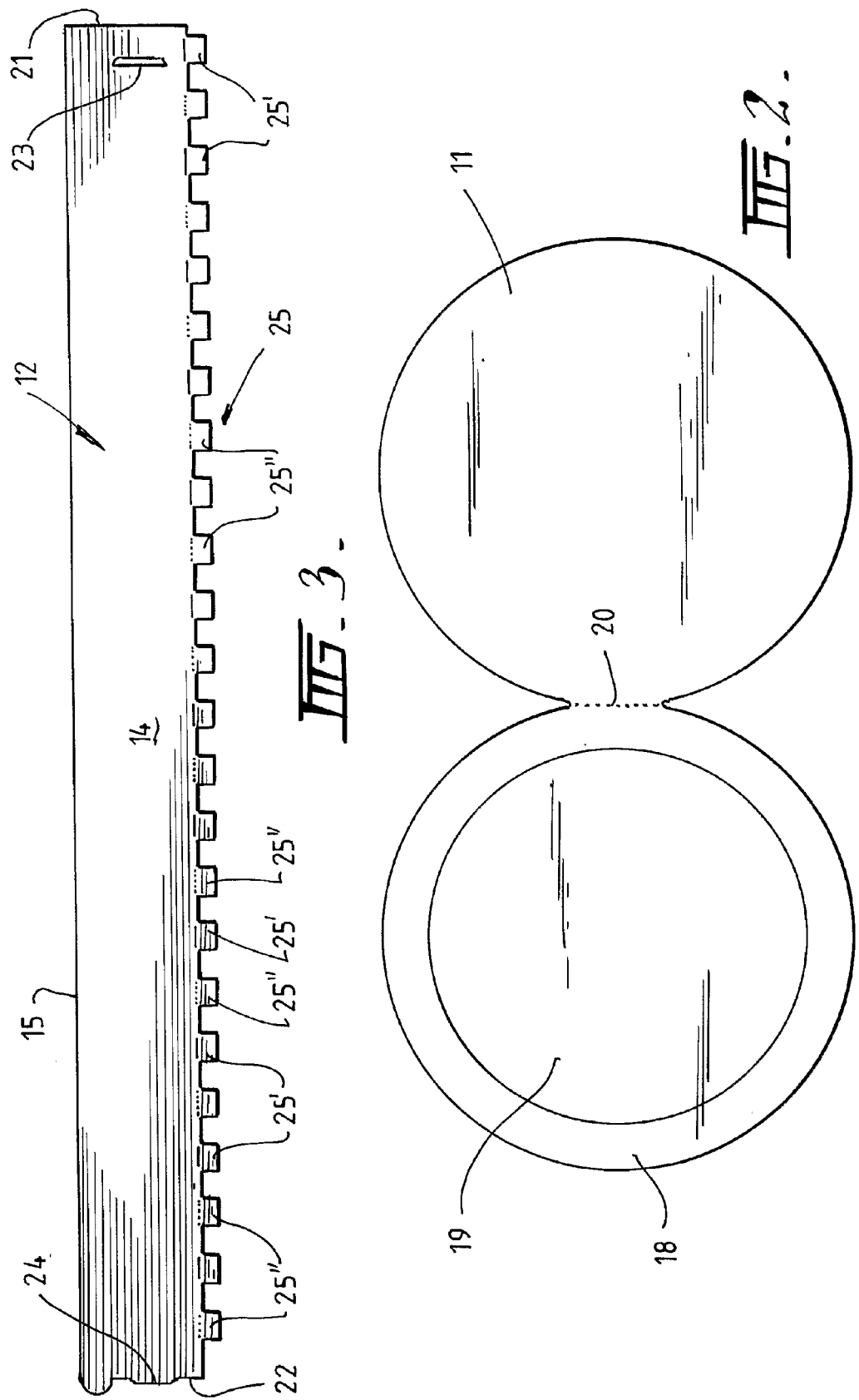

FOOD PREPARATION MOULD

TECHNICAL FIELD

The present invention relates generally to a mould, and more specifically to a single use mould for food preparation. The invention has particular application for baked products such as cakes and is herein described in that context. However, the invention is not limited to that application and may also be used in other applications, such as in forming pastry shells, cold set food products such as mousses and cheesecakes or other non-food products such as plaster and wax.

BACKGROUND OF THE INVENTION

Moulds are often used as a tool for food preparation where a metered amount of batter is placed in the mould cavity. This process may be done manually, but in commercial operations, a depositor may be used to automate this process. Further, in the making of pastries such as flans and quiches an overhead platen typically descends under force to locate the pastry base evenly on the base and may drive the pastry mix up between a gap between the overhead platen and the edge of the mould. A filling may then be deposited on formed pastry base.

One very common type of mould is the cake tin. Cake tins may have a peripheral wall of fixed shape. Others have a wall structure that is separable from the base and can be opened up to allow easy discharge of the cake from the tin. These tins, known as springforms, are widely used in industrial applications and are typically made from metal.

Although moulds such as the springform tins are designed for multiple use, in a commercial environment they tend to limit commercial production rates in that they require cleaning before use. Furthermore, by re-using the moulds, it is usually not feasible to leave the product in the moulds after it has been baked. Therefore the moulds are only used in preparation of the product and additional packaging is required for preparing the product for transport and sale.

SUMMARY OF THE INVENTION

In a first aspect, the invention provides a mould comprising a base; a collar having a continuous wall extending between opposite upper and lower edges, and one or more tabs extending from the lower edge, the collar upstanding from the base with the lower edge abutting the base; and retaining means operative to retain the tabs in relation to the base so as to retain the lower edge of the collar in proximity with the base.

In accordance with the mould of the above form the location of the collar on the base defines a cavity in which batter or other settable material may be located.

In one form the collar wall incorporates a releasable connection to enable opening of the collar. In this way the mould may operate in a similar manner to a springform tin.

In a particular arrangement, the collar is made from sheet material having opposite end edges that interconnect the upper and lower edges, the end edges being in abutting or overlapping arrangement to form the continuous wall. In particular embodiment, the releasable connection is formed between the opposite ends of the collar.

In a particular form, to allow easy release of the collar from the base, a frangible connection is formed between the tabs and the collar wall. That frangible connection may be formed by perforation, or by reducing the thickness of the material, at the connection or by other techniques known in the art.

In a particular embodiment, the mould is made so that at least the collar is for single use and is made from fibreboard, which if the mould is for baked products, is ovenable. The fibreboard may be carton board, or corrugated board and may be coated with suitable ovenable polymeric coatings include polyester, polypropylene, silicone or polytetrafluoroethylene. Suitable sheets include solid-bleached sulphate (SBS) or corrugated linerboard having a PMP coating manufactured by MeadWestvaco. MeadWestvaco 'Printcote Ovenable' may be one commercial example of ovenable material board. In an alternate form the collar can be formed from coated paper which is one form is ovenable. Suitable sheets of coated paper include kraft paper.

In one form, the retaining means arranged to maintain the tabs in close proximity to the base, is by way of bonding of at least some of the tabs to the base. For example, adhesive may be applied between the tabs and the base. In another form, where the tabs and/or the base include a polymeric material, the bonding may occur on the application of heat and pressure. In another form, the mode of securing the tabs to the base may be by virtue of a mechanical fastening arrangement. Such a fastening arrangement may be formed by forming interlocking elements in both the tabs and the base.

In one particular form, the tabs extend out of the plane of the collar and the retaining means comprises at least one overlay element that locates over the tabs and the base so as to cause the tabs to be entrapped between the overlay element(s) and a surface of the base.

In a particular form, the proximal end of the tabs may be disposed above the lower edge of the collar. In this way, the tabs can be folded out of the plane of the wall of the collar and wherein when folded, the tabs are designed to align with the lower edge of the collar so as to maintain contact between the collar and base along the entire periphery of the collar.

In one form, at least some of the tabs extend outwardly out of the plane of the collar and wherein the mould further comprising a locking member having an inner edge disposed around the periphery of the collar, the locking member forming the overlay element (or at least one of the overlay elements) so that the outwardly directed tabs are entrapped between the locking member and the base.

In a particular embodiment, the locking member is formed from sheet material such as fibreboard. In one form, the locking member is made from ovenable fibreboard such as those described above in relation to the collar.

In one form, the locking member is formed from a unitary structure. However, this unitary structure may be replaced in other embodiments by a series of smaller elements. Thus, the term "locking member" as herein is to be construed not only for a single element, but also a functioning equivalent arrangement of shorter sections of such an element.

In a particular arrangement, the locking member is bonded to the base. The locking member may be secured to the base in various ways. For example, adhesive may be applied between the locking member and the base. In another form, where the locking member and/or the base include a polymeric material, the bonding may occur on the application of heat and pressure to the engaging members. In another form, the mode of securing the locking member to the base may be by virtue of a mechanical fastening arrangement. Such a fastening arrangement may be formed by forming interlocking elements in both the locking member and the base.

In one form, the locking member is bonded to the base along one or more regions that are spaced outwardly from the inner edge of the locking member. In a particular form, the bond is applied by the application of pressure to the locking member and the base. An advantage of this arrangement is that the forming of the bond may tend to open up a gap between the inner edge of the locking member and the base which can facilitate the location of the tabs therebetween.

In one form, the mould further comprises an insert which is locatable within the collar in a snug fit with the wall and the base of the mould. In one form the insert is formed of sheet material and in a more particular form, the insert is made from an ovenable fibreboard or paper such as those described above with reference to the collar.

In one form, at least some of the tabs extend inwardly out of the plane of the collar and the insert forms the overlay element (or at least one of the overlay elements) so that the inwardly directed tabs are entrapped between the insert and the base.

In general, it is necessary to form an adequate seal between the collar and the base to inhibit excessive leaking of batter from the mould. The provision of such a seal is made more problematic in baked products where the batter expands in the mould as it is being baked, thereby increasing the pressure at the joint between the base and collar.

In one form, the retaining means is adequate to provide the seal so that the engagement of the lower edge of the collar with the base provides the main seal. In another form the insert located in snug fit with the inner surface of the collar wall may also contribute to providing the seal.

In one form, to further improve the seal between the collar and the base, the upper surface of the base incorporates an annular recess in which the lower edge of the collar locates.

In a further aspect, the invention provides a mould comprising a base; a collar having a continuous wall extending between opposite upper and lower edges, the collar upstanding from the base with the lower edge abutting the base; and an insert disposed within the collar in a snug fit with the wall of the mould, the insert providing at least part of a seal to inhibit leaking of material within the mould from between the collar and the base.

In one embodiment, the collar, base and insert may be of any form described above. Further, in one form of this latter aspect of the invention, the mould may further comprise tabs and retaining means described above.

In a particular embodiment, the mould of any form described above, further comprising support means operative to support the collar wall.

In one form, the inner edge of the locking member is arranged to bear against the collar wall so as to form at least part of the support means arranged to support the collar wall.

In one form, the support means is operative to support the collar wall along a region spaced from the lower edge of the wall. In a particular arrangement of this later form, the base includes spaced apart upper and lower members, each of the members being formed from sheet material, the lower edge of the collar being disposed on the lower member and wherein the upper member includes an opening to receive the collar, wherein the upper member further includes an abutment surface arranged to bear against an intermediate region of the collar so as to form at least part of the support means arranged to support the collar wall. A suitable base of this type is disclosed in International patent application WO 2004/066735, entitled "A Food Preparation and Distribution Tray", the contents of which are herein incorporated by cross reference. In this arrangement, the upper and lower members are interconnected by one or more side walls so that the base has a box like construction.

An advantage of at least one form of the mould is that it can be made in many different shapes in view of the collar being made from sheet material that is disposed generally edge on to the base. However, in some instances it is difficult to maintain the shape of the collar, particularly where there are sharp corners and the like. The use of the support means assists in enabling the collars to keep their shape.

In a further aspect, the invention provides a mould comprising a base; a collar having a continuous wall extending between opposite upper and lower edges, the collar upstanding from the base with the lower edge abutting the base; and support means operative to support the collar wall.

In one embodiment, the collar, base and support means may be of any form described above.

In a further form of this latest aspect, the mould includes an insert as described above.

In a particular embodiment in any of the forms described above, the base is formed from sheet material, which may be the same material as the locking member and/or the collar, typically being a fibreboard which in one form may be ovenable. In an alternative form the base may be formed from coated paper which in one form is ovenable. Suitable ovenable polymeric coatings include polyester, polypropylene, silicone or polytetrafluoroethylene.

An advantage of embodiments of the mould of the present invention is that a mould is inexpensive to manufacture as it can be made from inexpensive material such as fibre board. Accordingly, the mould may be economically employed as a single use product.

A further advantage of the mould is that mechanical product portioning can be completed after baking without first removing the baked product from the mould. In using the mould in this manner the mould can now support and protect the individual portions during transportation.

A further advantage of the mould according to a particular embodiment is that the mould may also form part of the packaging of the product. In this regard, the insert and/or the base may be used as the support structure for the product. In another arrangement, both the base and the collar remain in tact and help protect and facilitate handling of the product to its point of sale. In this latter arrangement, the collar may also be printed if required.

A further advantage of using a fibreboard for a baking mould is that it allows for even distribution of heat through the product being baked as the compared to traditional metal moulds where the metal will heat up to an extent where it causes a significant impact on heat distribution.

The mould when formed from the sheet may be provided to its point of use in a knocked down form and assembled on site. In this regard, in a further form, the invention provides a fibreboard preform for forming a mould according to any form described above, the preform comprising a collar; and a base arranged to receive the collar. Typically these elements would be provided in a substantial sheet form thereby facilitating transporting and storage.

BRIEF DESCRIPTION OF THE DRAWINGS

It is convenient to hereinafter describe embodiments of the food preparation mould with reference to the accompanying drawings. The particularity of the drawings and the related description is to be understood as not superseding the generality of the preceding broad description.

In the drawings:

FIG. 1 is a exploded perspective view of a food preparation mould.

FIG. 2 is a plan view of the locking member and base of the mould of FIG. 1;

FIG. 3 is a plan view of perform for the collar of the mould of FIG. 1;

FIG. 4 is a detailed cross-sectional view of the joint between the base of the mould of FIG. 2;

FIG. 5 shows the detailed cross-sectional view of the joint of FIG. 4 with the insert and locking member in place;

DETAILED DESCRIPTION

Figure 6:
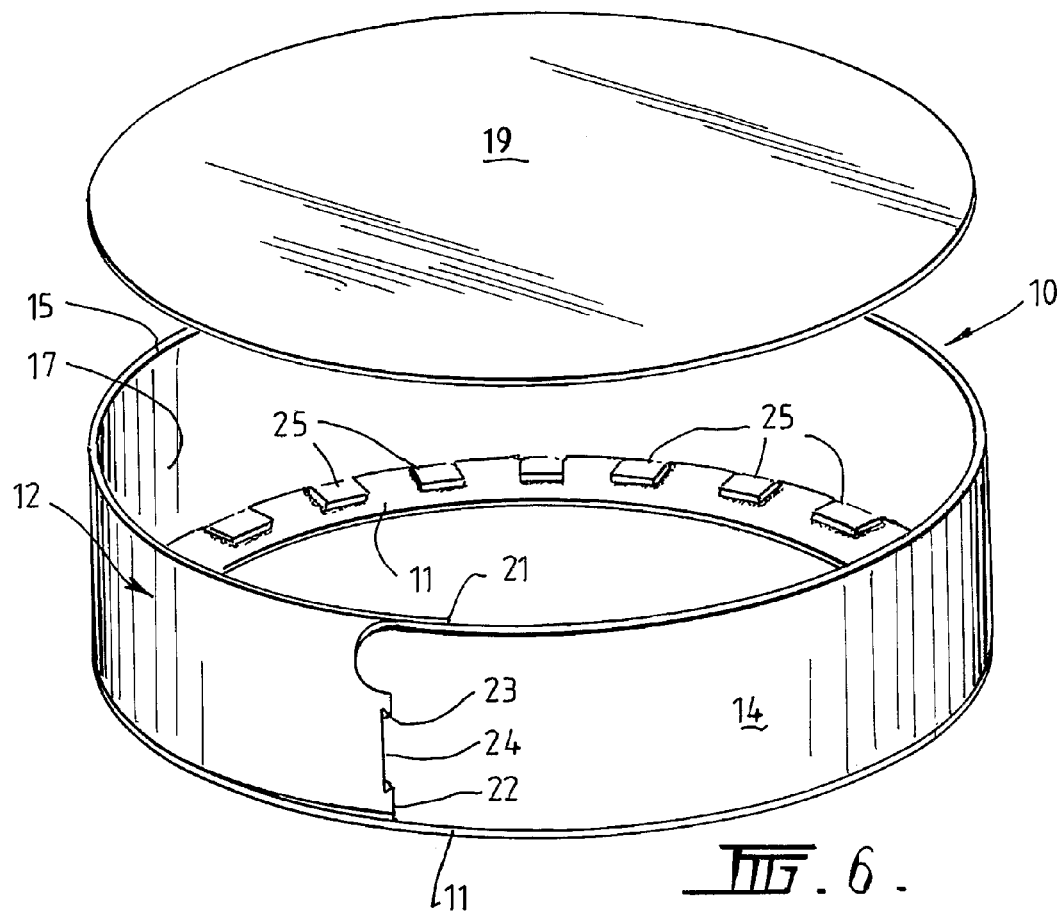
FIG. 6 is an exploded perspective view of a second embodiment of a food preparation mould.

Turning firstly to FIG. 1, a mould which in the illustrated form is designed for baking comprises a flat base 11 and a collar 12 which extends upwardly from an upper surface 13 (see FIG. 4) of the base 11. The collar 12 has a continuous wall 14 which extends between upper and lower edges (15 and 16 respectively). The collar locates on the base 11 and defines a cavity 17 in which batter or other liquid or semi liquid material is received.

The mould 10 further includes a locking member 18 which has a cut-out in the form of an annular ring which is bonded to the upper surface 13 of the base 11 (as shown in FIG. 5) and designed to retain the collar in engagement with the base as will be described in more detail below. The locking member 18 is sized so as to protrude slightly from the base 11 to thereby provide an edge surface to lock a lid (typically a thermo-formed lid) to the base. An insert 19 is also provided which locates within the cavity 17 so as to locate against the upper surface 13 of the base 11. The insert 19 is designed to locate snugly against the inner surface of the collar wall 14 (see FIG. 5) so as to provide at least part of a liquid seal between the collar 12 and the base 11.

The components of the mould 10 are all formed from sheet material. With reference to FIGS. 2 and 3, in the illustrated form, the base 11, the locking member 18 and the insert 19 may all be formed from a single sheet. Further each of these components are merely cut from the sheet. In this regard, the insert 19 is formed from the portion of the sheet removed in forming the hole in the annular locking member 18. Moreover in the embodiment as shown, the base 11 is integrally formed with the locking member 18 through a hinge connection 20 which is formed by a fold line in the sheet material.

Turning to FIG. 3, the collar 12 is similarly formed from sheet material with opposite ends 21, 22 of the collar sheet being interconnected so as to form the continuous wall of the collar 12. In the arrangement as shown, a releasable coupling is formed at the interconnecting ends 21, 22. In the arrangement one end 21 includes a slot 23 whereas the other end 22 includes a tongue 24 which locates in that slot. Alternatively the releasable coupling is formed by the overlaying of the upper edge 15 of one end 21 of the collar 12 over the upper edge 15 of the opposite end 22 of the collar 12.

The collar 12 also includes a plurality of tabs 25 which extend from the lower edge 16 of the collar 12. These tabs are integrally formed with the wall 14 of the collar and which are connected to the wall by frangible connections 26. These frangible connections 26 are disposed inboard slightly of the edge 16 and are typically formed by perforating the sheet. In the embodiment shown the tabs 25 are of different length with tab $25^I$ being slightly larger than tabs $25^{II}$. Further, the tabs are arranged to that the longer tabs $25^I$ alternate with the shorter tabs $25^{II}$. It is to be appreciated that in another form, the tabs may be of uniform length.

In the embodiment as illustrated, the mould is made from a ovenable food grade coated board such as that supplied by MeadWestvaco. The collar 12 may include a silicon coating.

The tabs are designed to be received between the locking member 18 or insert 19 and the base 11 so as to effectively retain the collar to the base. In this way the locking member 18 and the insert 19 act as overlay elements to retain the collar in proximity with the base. This is best illustrated with reference FIGS. 4 and 5.

When assembling the mould 10, the lower edge 16 of the collar 12 locates on the upper surface 13 of the base 11 as best illustrated in FIG. 4. An annular recess 27 may be formed in the base to both facilitate locating of the collar 12 in place and also to improve the contact between the collar 12 and the base 11. In locating the collar 12 in place, the locking tabs 25 are turned out of the plane of the collar wall 14. As the connections 26 between the wall 14 and the tabs 25 are above the lower edge 16, that edge 16 is disposed below the locking tab 25 so as to locate fully within the groove 27. In the illustrated form the shorter tabs $25^{II}$ extend outwardly so as to be substantially parallel and abutting with the upper surface 13 of the base 11 whereas the longer tabs $25^I$ extend inwardly.

As illustrated in FIG. 5, the locking member 18 locates over the base 11 so that the tabs $25^{II}$ are retained between the base 11 and the locking member 18. The locking member is secured to the base 11 so that the tabs $25^{II}$ are firmly retained between those elements. The method of fixing the locking member 18 to the base 11 may be via a pressure sensitive glue applied to one or both of the base and the locking member or by sonic welding or by reactivation of glue by radio frequency or microwave or by a mechanical fastening arrangement or the like. This may be done prior to, or after, the tabs are located in place.

In the illustrated form, the locking member 18 is bonded to the base along its outer peripheral edge 28. This bonding is done under pressure which forms a continuous seal and also causes the inner edge to be slightly raised from the base 11. The raising of the edge 29 facilitates location of the tabs $25^{II}$ between the locking member 18 and the base 11. It also allows the inner edge 29 of the locking member to bear against the collar wall 14 at a location which is slightly further spaced from the lower edge 16 of the collar 12.

The inner edge 29 of the collar 18 is arranged to bear against the collar wall 14 so as to support the wall to assist in maintaining its shape during baking. As a cake is baked, it expands which places pressure on the collar wall tending it to deformed. This tendency to deform is resisted in this embodiment by the inner edge 29 of the locking ring 18 which acts as a support means for the collar wall.

To complete the assembly of the mould 10, the insert 19 is located within the cavity 17 and therefore provides a base for the cake. The insert 19 locates in a snug fit against the collar wall 14 thereby further supporting the collar wall. Moreover, the insert overlays the inwardly directed tabs $25^I$ thereby forms part of the retaining means which maintains the lower edge of the collar 16 in engagement with the base 11. The insert 19 also contributes to sealing between the collar 12 and the base 11.

Figure 7:
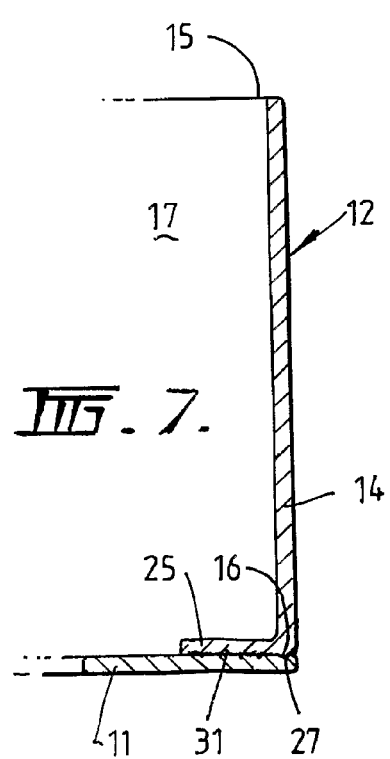
FIG. 7 is a detailed cross sectional view of the joint between the collar and the base of the mould of FIG. 6.
Figure 8:
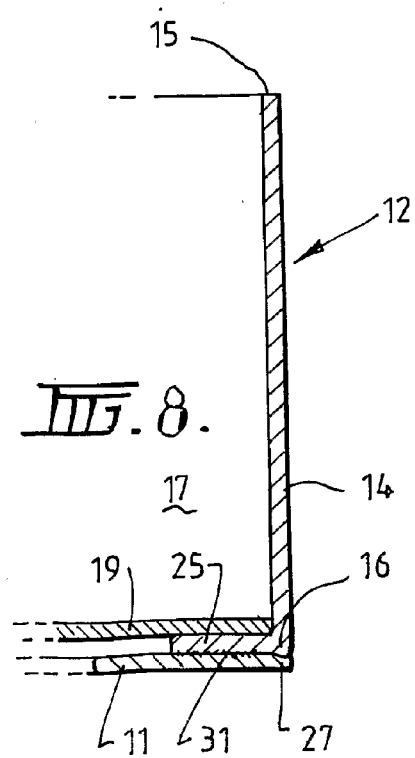
FIG. 8 is the detailed cross sectional view of the joint of FIG. 7 with the insert in place.

Turning to FIGS. 6 to 8, a second embodiment of a mould 30 is illustrated. As the mould 30 includes many of the features of the earlier embodiment, like reference numerals have been given to like features.

Consistent with the earlier embodiment, the collar 12 of the mould is arranged to locate on the base 11. Again both the base and the collar are made from fibreboard which is ovenable. Furthermore, the collar incorporates the tabs 25 which project downwardly from the lower end 16 of the collar 12. In the version of the mould 30 as illustrated, the tabs 25 are of uniform length.

Figure 9:
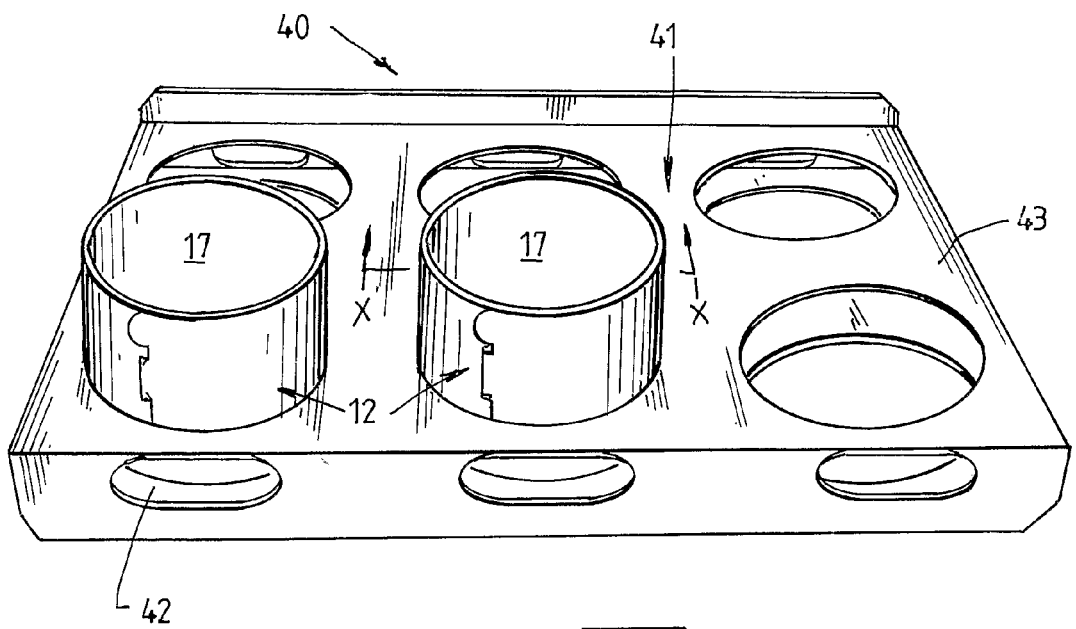
FIG. 9 is a perspective view of a third embodiment of a food preparation mould.
Figure 10:
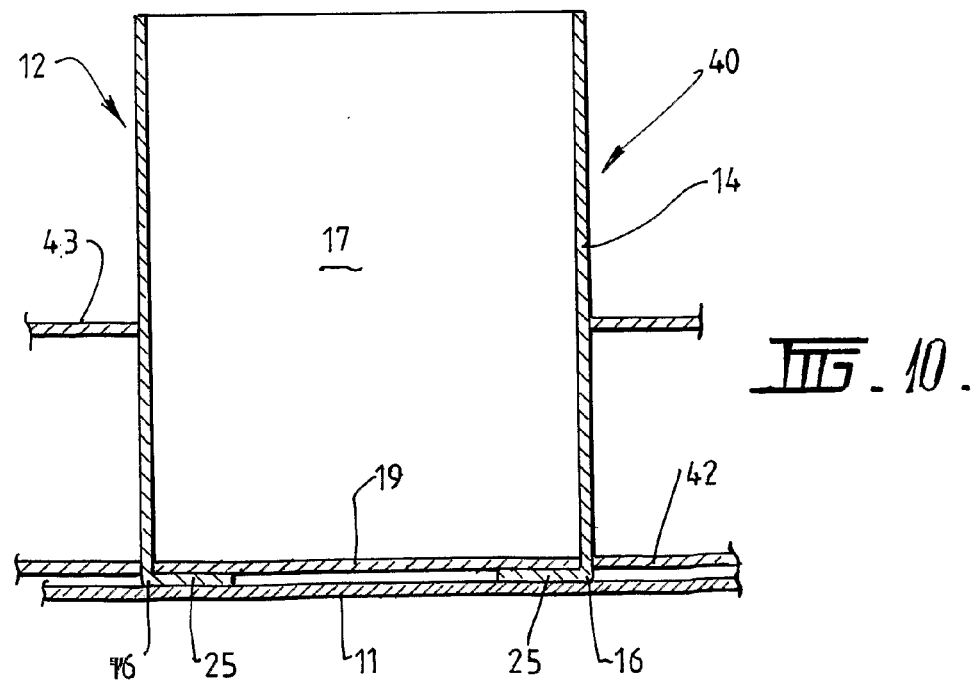
FIG. 10 is a sectional view along section line X-X of FIG. 9.

The main distinction between the mould 30 and the previous embodiment 10 is that a different approach is used to retain the tabs 25 in engagement with the base 11. In particular, rather than using a locking member 18 as described in the earlier embodiment, the tabs are all turned inwardly and are bonded directly onto the base 11 using an adhesive 31 as best illustrated in FIGS. 9 and 10. A locking member 18 is not required and, as such, the base does not project significantly beyond the perimeter of the collar 12.

Again, as in the earlier embodiment, the insert 19 locates within the cavity 17 so as to locate snugly against the inner surface of the collar wall 14. Further, the insert entraps the tabs 25 between the insert and the base.

As distinct from the earlier embodiment, the collar wall 14 is not separately supported. As such, the mould 30 is better suited to situations where there is not excessive pressure build up in the mould during formation of the product. As such, the mould 30 is well suited to cold set products or where the baked product is relatively thin.

A third embodiment 40 of the mould is illustrated with reference to FIGS. 9 and 10. Again, as the embodiment of the mould 40 includes many of the features of the earlier embodiment, for convenience like features have been given like reference numerals.

In contrast to the earlier embodiments, the mould 40 is arranged to produce multiple independent cakes or muffins (six in the illustrated form), rather than an individual cake as in the earlier embodiments. Furthermore, the base 11 forms part of a tray 41 which is arranged to provide additional support for the collars 12 (only two of which are shown) as will be discussed in more detail below. This tray 41 is also ovenable and is the subject of international patent application WO 2004/066735, entitled "A Food Preparation and Distribution Tray" the contents of which are herein incorporated by cross reference. However, instead of using the individual paper "patty" cups as disclosed in that earlier application, the mould 10 uses the collars 12 which are retained against the base 11.

As best illustrated in FIG. 10, the tray 41 includes a lower (or base) member 11, an overlaying element 42 which is disposed on the base member 11, and an upper member 43 which is spaced both from the overlay member 42 and the base member 11. Both the overlay member 42 and the upper member 43 include cut outs (which in the illustrated form are circular) to receive the collar 12.

In this way, the collar 12 is able to locate with its lower edge 16 on the base member 11. Furthermore the collar includes the tabs which project inwardly into the cavity of the individual moulds 17. The insert 19 locates within the cavity 17 so that the tabs 25 are entrapped between the insert 19 and the base member 11 in a similar manner as disclosed above. Because in the illustrated form the collars are of only relatively small diameters, the inventors have found that there is no need to separately bond the tabs 25 to the base member 11. It is sufficient to retain the lower edge 16 in engagement with the base 11 merely by having the tabs 25 disposed inwardly and located under the insert 19. Because the insert 19 is a snug fit with the collar wall 14 and because the overlay element 42 bears against the collar wall 14, there is an adequate seal which prevents leakage of batter from between the collar 12 and the base 11.

A significant feature of the embodiment 40 is that the upper member 43 bears against the collar of the mould 40 in spaced relation from the lower edge 16. This therefore supports the collar 12 to retain its shape during use of the mould.

The mould 40 is ideally suited to produce individual cakes which are tall relative to their diameter. Further, while the mould 40 is for making multiple cakes, it is to be appreciated that it could be modified for single use application.

In use, the moulds 10, 30, 40 are ideally suited for commercial kitchens where the moulds are provided either in knock down form and assembled on site or preassembled. Once assembled, pastry dough or batter, which may be in a liquid or in a flowable state form, is then inserted in the cavity 17 whereafter the batter is allowed to set typically by heating or cooling.

After the product has been formed the collar can be stripped from the base simply by releasing the ends 21 and 22 of the collar 12 and tearing off the wall section 14 of the collar from the retaining tabs 25. Alternatively, the collar may be used as part of the product packaging and is thereby left in place after the product has set.

An advantage of the moulds 10, 30, 40 is that they are inexpensive to manufacture as they are made merely from coated board or coated paper and is therefore ideally suited for single use. In addition, all components are made from sheet material thereby obviating the need for any expensive moulding equipment. This simplifies the manufacturing process and in particular allows for the dimensions of the mould to be easily varied to suit customer needs. The moulds are also ideally suited to be included into complex shapes such as hearts or the like.

A further advantage of the moulds 10, 30, 40 is that the seal provided has been found satisfactory for both baked and cold set products regardless of how liquid the original batter is. Accordingly, the mould is well suited to be used over a wide range of products in food preparation.

Whilst the food preparation mould has been described with reference to a specific embodiment, it should be appreciated that the mould can be embodied in many other forms. In particular, the mould may be used in applications other than food preparation.

In the claims which follow and in the preceding description of the food preparation mould, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the mould.

The invention claimed is:

1. A mould comprising a base;
   a collar having a continuous wall extending between opposite upper and lower edges, and one or more tabs extending from the lower edge, the collar upstanding from the base with the lower edge abutting the base;
   an insert locatable within the collar in snug fit with the wall; and
   retaining means operative to retain the tabs in relation to the base so as to retain the lower edge of the collar in proximity with the base, wherein the collar wall incorporates a releasable connection to enable opening of the collar, and a frangible connection is formed between the tabs and the collar wall, wherein the retaining means comprise an overlay element that locates over the tabs and the base, and wherein at least some of the tabs extend outwardly out of a plane of the collar and wherein the mould further comprises a locking member having an inner edge disposed around a periphery of the collar, the locking member forming the overlay element such that the outwardly extended tabs are entrapped between the locking member and the base, and wherein at least some of the tabs extend inwardly out of the plane of the collar and wherein the insert forms the overlay element such that the inwardly directed tabs are entrapped between the insert and the base.

2. A mould according to claim 1, wherein the collar is made from sheet material having opposite end edges that interconnect the upper and lower edges, the end edges being in abutting or overlapping arrangement to form the continuous wall.

3. A mould according to claim 2, wherein the releasable connection is formed between the opposite ends of the collar.

4. A mould according to claim 1, wherein the retaining means incorporates a bond formed between at least some of the tabs and the base.

5. A mould according to claim 1, wherein the locking member is formed from sheet material and is bonded to the base.

6. A mould according to claim 5, wherein the locking member is formed from fibreboard.

7. A mould according to claim 1, wherein the locking member is bonded to the base along a region spaced outwardly from the inner edge of the locking member.

8. A mould comprising a base;
a collar having a continuous wall extending between opposite upper and lower edges, and one or more tabs extending from the lower edge, the collar upstanding from the base with the lower edge abutting the base;
retaining means operative to retain the tabs in relation to the base so as to retain the lower edge of the collar in proximity with the base; and
an insert locatable within the collar in snug fit with the wall, wherein the tabs extend out of a plane of the collar and the retaining means comprises an overlay element that locates over the tabs and the base so as to cause the tabs to be entrapped between the overlay elements and a surface of the base, and wherein at least some of the tabs extend inwardly out of the plane of the collar, and wherein the insert forms said overlay elements so that the inwardly directed tabs are entrapped between the insert and the base.

9. A mould according to claim 8, wherein the insert is formed from sheet material.

10. A mould according to claim 9, wherein the insert is formed from fibreboard.

11. A mould according to claim 8, further comprising support means operative to support the collar wall.

12. A mould according to claim 1, wherein the inner edge of the locking member is arranged to bear against the collar wall so as to form at least part of support means arranged to support the collar wall.

13. A mould according to claim 1, wherein the base includes spaced apart upper and lower members, each of the members being formed from sheet material, the lower edge of the collar being disposed on the lower member and wherein the upper member includes an opening to receive the collar, wherein the upper member further includes an abutment surface arranged to bear against an intermediate region of the collar so as to form at least part of support means arranged to support the collar wall.

14. A mould according to claim 13, wherein the support means is operative to support the collar wall along a region spaced from the lower edge of the wall.

15. A mould according to claim 14, wherein the upper and lower members are interconnected by one or more side walls.

16. A mould according to claim 1, wherein the collar is formed from fibreboard.

17. A mould according to claim 1, wherein the base is formed from sheet material.

18. A mould according to claim 14, wherein the base is formed from fibreboard.

19. A mould according to claim 1, wherein the locking member is integrally formed with the base from sheet material, and wherein a fold line is formed between the locking member and the base to allow the locking member to overlay the base.

20. A disposable mould according to claim 1, wherein the insert provides at least part of a seal to inhibit leaking of material within the mould from between the collar and the base, wherein the mould is made from fibreboard.

21. A mould according claim 20, wherein the fibreboard is ovenable and selected from the group comprising; carton board, corrugated fibreboard, or coated fibreboard.

22. A fibreboard preform for forming a mould according to claim 1, the preform comprising a collar; and a base arranged to receive the collar.

23. A preform according to claim 22, further comprising a locking member arranged to overlay the base.

24. A preform according to claim 23, wherein the locking member is bonded to the base.

25. A preform according to claim 22, further comprising an insert arranged to locate within the collar in snug fit with the collar wall.

26. A preform according to claim 22, wherein the preform is manufactured in a flat form to facilitate packaging and transportation of the preform.

27. A mould according to claim 8, wherein a frangible connection is formed between the tabs and the collar wall.

28. A disposable mould according to claim 8, wherein the insert provides at least part of a seal to inhibit leaking of material within the mould from between the collar and the base, wherein the mould is made from fibreboard.

* * * * *